Patented May 5, 1931

1,803,943

UNITED STATES PATENT OFFICE

ELROY J. MILLER, OF EAST LANSING, MICHIGAN, ASSIGNOR TO MICHIGAN STATE BOARD OF AGRICULTURE, OF EAST LANSING, MICHIGAN

PROCESS FOR THE PRODUCTION OF ASH-FREE ADSORBENT CARBON

No Drawing.   Application filed November 11, 1927.   Serial No. 232,709.

One object of the present invention is to produce adsorbent charcoals derived from various sources which will be substantially free from ash and impurities, especially inorganic matter.

Another object is to produce activated charcoals from various sources in a degree of purity equal to that of the best grades of carbohydrate charcoal.

A further object of the invention is to so standardize activated charcoals derived from various sources so that the study of adsorption phenomena, exhibited by various animal, vegetable, and carbohydrate charcoals, may be rendered commensurable.

Other purposes and objects of the invention will be apparent from the character and nature of the products and process as hereinafter described.

Adsorbent charcoals, because of their relatively great activity, have been used perhaps more frequently than other adsorbent material, both in the study and practice of adsorption of various materials from solution. It has been assumed that the material used was essentially pure carbon, and the role of other constituents was generally ignored. These adsorbents are, however, really but poorly defined substances, and the results obtained with them often showed considerable variation.

Many attempts have been made to purify these materials, but they have been unsuccessful as far as any appreciable reduction of the inorganic content was concerned. The usual procedure was to extract the charcoals with concentrated acids and occasionally fusion with alkali was attempted. A blood charcoal, understood to be purified by acids, has been a favored material for adsorption studies. But even this material has been found to contain approximately as high as eight percent of inorganic matter.

Freudlich and Losev found that the ash content of this material is not appreciably reduced by treatment with concentrated hydrochloric acid. They boiled the charcoal repeatedly with concentrated hydrochloric acid, then washed with hot distilled water, and finally with conductivity water. After such treatment the ash-content was still from eight to five percent. Odén and Andersson used essentially the same method, but in addition subjected the charcoal to a final extraction with organic solvents. Firth and Watson resorted to extraction with aqua regia. A blood charcoal which contained 8.82% of ash showed a reduction, after several days' treatment, to 7.3%. Even after prolonged treatment for about a month the ash content was still 6.32%. Only after very prolonged treatment could the ash content be appreciately reduced below this figure. But this drastic and prolonged treatment resulted in a considerable loss of the charcoal thus treated.

Commercial sugar charcoal contains normally much less ash, but treatment with concentrated hydrochloric acid in the usual manner only reduced the ash content from 0.57 to 0.55 per cent. These illustrations are typical of the results hitherto obtained in the efforts to purify adsorbent charcoals.

In my studies of adsorption of various materials I concluded that, in order to make the results of the investigations of these adsorption phenomena uniformly reproducable and comparable, it was desirable to eliminate the complications and the differences resulting from the uncertain action of varying amounts of ash.

By my process of purification, which will be described in further detail hereafter, I am able to produce activated charcoals from divers animal or vegetable sources, in which the ash content can be reduced ordinarily to a few hundredths of one percent; and if the process be repeated a sufficient number of times, or if a charcoal with a low ash content is being treated, the reduction can be carried to less than one hundredth of one per cent.

It has heretofore generally been considered that charcoals of different origins have different and characteristic properties as to their ability to adsorb substances from solution. I have found, however, that such variations can be explained on the basis of adsorbed substances on their surfaces or of mechanically held or occluded inorganic matter, and that the specific action ascribed to various charcoals with respect to adsorption from solutions of acids, bases, and salts, were really due to variations in the nature and extent of these impurities, as were also the contradictory data and conclusions concerning hydrolytic adsorption.

One of the outstanding characteristics of pure activated sugar charcoal is its capacity for adsorbing relatively large quantities of acids and its inability to adsorb even traces of strong inorganic bases. I have found, however, that this is not a specific characteristic of sugar charcoal alone, and I have been able, by my process, to so purify charcoals from various sources, as before indicated which will also adsorb acids very strongly, but will not adsorb the bases. Thus the adsorption results obtained with charcoals from any source will be comparable with those obtained from sugar charcoal, provided only that the ash content be sufficiently reduced.

My process may be carried out in a number of ways, as will be obvious from the description following, but my preferred procedure is as follows:

*Example.*—A given charcoal after being thoroughly dried, is ground to a fineness to permit it to pass through a 300-mesh sieve. It is then mixed in a platinum vessel with a sufficient quantity of a mixture of mineral acid, consisting of one part of hydrofluoric acid and five parts of hydrochloric acid, to make a thin paste, which is then warmed gently over a low flame until most of the hydrofluoric acid has been driven off. After most of the acid has been thus expelled, the heating is increased to insure the complete removal of the acid. The charcoal is next boiled with concentrated hydrochloric acid, and is then diluted and filtered through hardened filter paper in a Büchner funnel. This extraction with concentrated hydrochloric acid is repeated a second time, after which the charcoal is washed by repeated boiling with distilled water until most of the hydrochloric acid has been removed.

When the treatment of the charcoal has proceeded thus far the ash content has been reduced to a few tenths of one percent, depending upon the kind of charcoal used, the fineness to which it was reduced, etc.

In order to reduce the ash content still further, the charcoal is now dried in an oven, say at not less than about 115° C., and is then ignited at a temperature of 900° to 1200° C. in silica vessels from which the air is excluded to prevent oxidation and loss of carbon.

The above treatment with hydrofluoric acid and extractions with hydrochloric acid are repeated until the desired purity has been obtained. When the ash has been removed, the charcoal is ignited to drive off the adsorbed acids, and is finally washed by boiling several times with a good grade of distilled water or conductivity water, and is then dried. The ignition drives off practically all the adsorbed acids. A minute quantity of acid, however, still remains even after ignition, and, while this amount is negligible for most purposes, it may be removed readily by boiling a suspension of the charcoal in conductivity water to which has been added approximately 1 cc. of a 0.02 N sodium or potassium hydroxide solution per gramme of charcoal. The excess alkali and inorganic salt formed are then quantitatively removed by boiling and filtering three or four times.

The process thus described in the foregoing example is susceptible to considerable modification without departing from the principle and scope of the invention. Thus for instance, hydrofluoric acid alone may be used in the early step of the process instead of the mixture of hydrofluoric and hydrochloric acid. The function of the hydrofluoric acid is to attack the otherwise insoluble silicates and other ash constituents which are not readily decomposed by other mineral acids; no given concentration thereof need be employed for this purpose, but it may be used in varying strength as requirements may demand. I have on occasion found even greater dilutions than that of 1:5, as given in the example, to be effective.

What I claim as new and for which I pray the issuance of Letters Patent is:

1. The process of purifying commercial grades of activated charcoal which consists of reducing the same to a fine powder, mixing with hydrofluoric acid, warming the mixture moderately until most of the acid is driven off, then increasing the temperature to effect the further removal of the acid, boiling with hydrochloric acid, diluting with distilled water and filtering, treating the recovered charcoal thus obtained repeatedly with hydrochloric acid, diluting with water, and filtering as before; drying and igniting the charcoal at a temperature ranging between 900° to 1200° C. under exclusion of air.

2. The process of purifying commercial grades of activated charcoal comprising the steps of drying of the charcoal, reducing the same to fine powder of substantially 300 mesh, treating with a mixture of hydrofluoric acid and hydrochloric acid in sufficient quantity to form a thin paste, warming the mixture moderately until most of the acid is driven off, then increasing the temperature to effect the complete removal of the acid, boiling with concentrated hydrochloric acid, diluting with distilled water and filtering through hardened filter paper;

subsequently treating the recovered charcoal again with concentrated hydrochloric acid, diluting and filtering as before; then drying at a temperature of about 115° C., and finally igniting the charcoal at a temperature ranging between 900° to 1200° C. under exclusion of air.

3. The process of purifying commercial grades of activated charcoal comprising admixture with hydrofluoric acid, removing the said acid, boiling with hydrochloric acid, and then removing the last named acid.

4. The process of purifying commercial grades of activated charcoal comprising admixture with a mixture of mineral acid containing hydrofluoric acid, removing the said acids, boiling with hydrochloric acid, and removing the last named acid.

5. The process of purifying activated charcoal, comprising alternate treatments first with hydrofluoric acid and next with repeated treatments of hydrochloric acid, repeating this cycle of applications until all of the ash originally contained therein has been substantially removed.

6. The process of purifying activated charcoal, which consists of reducing the same to a powder, treating with a mixture of hydrofluoric acid and hydrochloric acid, warming the mixture until most of the acid is driven off, then increasing the temperature to effect the complete removal of the acid, boiling with concentrated hydrochloric acid, diluting with distilled water and filtering, repeating the treatment with concentrated hydrochloric acid as before; then drying the charcoal and finally igniting it under exclusion of air; and then repeating the cycle of steps, above set forth, until substantially all of the impurities originally contained in the charcoal are removed.

ELROY J. MILLER.